Patented June 18, 1935

2,005,148

UNITED STATES PATENT OFFICE 2,005,148

CARRIER CURRENT RELAY

Lester B. Le Vesconte, Irwin, and Edward H. Klemmer, Wilkinsburg, Pa., assignors to Westinghouse Electric & Manufacturing Company, East Pittsburgh, Pa., a corporation of Pennsylvania Application October 11, 1934, Serial No. 747,915

15 Claims. (Cl. 175—294)

Our invention relates to protective relaying systems for transmission lines, utilizing carrier currents, or equivalent means for providing a communicating channel between the two ends of a protected line-section.

An object of our invention is to provide a distinctive feature which will at the same time constitute an important improvement in what is known as intermittent carrier-current systems, and will also constitute a valuable means for safeguarding against faulty operations as a result of sudden through-power reversals during the process of clearing a fault in a portion of the transmission system other than the protected line-section.

An intermittent carrier-current system is one in which a carrier current is normally not impressed upon the transmission line, and in which the tripping circuits of the circuit breakers at each end of the protected line-section are normally ready to be completed as soon as local fault-responsive relays indicate the presence of a fault. In this system, these local fault-responsive relays are made sufficiently sluggish in their action so as to give time for a more quickly operating directionally responsive relay, at either end of the protected line-section, to respond to any condition indicating that the fault is outside of the protected line-section, in which case, carrier current will be superimposed upon the line, and a receiver relay at each end of the protected section will respond in such manner as to prevent the tripping of the circuit breaker at either end of the protected section, this being accomplished, of course, before the sluggishly operating fault-responsive relays have completed their fault-indicating movement.

Such intermittent carrier relay systems, as outlined above, and as known prior to the present invention, have suffered a handicap because of the fact that there is no known sluggishly operating fault-responsive relay, having the necessary time-hesitation of three to five cycles on a 50-cycle system, which will have a uniformly definite time of operation. It invariably happens that the relays will operate comparatively quickly for very severe faults, and very slowly for the least severe faults to which the relay is expected to respond, so that if the relay is made slow enough, for all faults, it will be very much too slow for the vast majority of faults, and if it is made suitable for average fault conditions, it will occasionally operate too fast, and thereby produce a faulty relaying operation, interrupting the power to the protected line-section when there is no fault therein.

There is another difficulty that has been experienced in all carrier-curent systems, whether continuous or intermittent, but which has never been altogether satisfactorily overcome in any previous intermittent carrier system, to our knowledge; and this is a difficulty which is introduced by the sudden reversal of the direction of through-power flow in the protected line-section during the process of clearing a fault which exists somewhere else in the transmission system. By through-power, is meant power that flows through the line-section in question, entering the section at one end and leaving it at the other. It is the presence of current or power leaving the section at one end which is the foundation on which the intermittent carrier system is based, being utilized to superimpose on the line a carrier-current which is utilized to inhibit tripping at either end of the section in question. It is now well-known, in the art of relaying, that there are times, during the process of clearing certain faults in another line-section,—that is, during the process of completing the opening of the circuit breakers in all phase conductors, and at both ends, of the faulty line-section somewhere else in the transmission system,—when the through power-flow in the sound line-section which is being protected will suddenly reverse, or seem to reverse, resulting in the removal of carrier-current from the end which was previously transmitting carrier, and the establishment of carrier-current transmission at the other end where current was at first entering the protected section but is now leaving it. The necessary movement of the contact members for effecting these functions is such that the carrier-current is usually removed faster, at the initially carrier-transmitter end, than it can be applied at the other end of the protected section, so that there may be an interval during which there is no carrier current superimposed on the sound line-section. Since carrier current is relied upon, in the intermittent carrier system, to inhibit faulty circuit-breaker tripping, it may easily follow that the circuit breakers may be tripped at one or both ends of the sound line-section being protected.

According to one method which has been adopted heretofore, for overcoming this reverse-power difficulty in intermittent carrier systems, without unallowably slowing up the entire relaying operation under all conditions of operation, means have been provided for responding to the transmission of carrier current, that is, responding to an indication that power is leaving the protected line-section at one end, and utilizing this response to operate means which are designed to prevent the operation of the sluggishly acting fault-responsive relays, so that, if the power reverses, there will be time for carrier current to be applied to the end at which power was previously entering the protected section, before the sluggishly acting fault-responsive relays, now released of inhibition, shall have time to complete their fault-indicating movement. The difficulty that has been experienced with this mechanism is that there is a certain interval of time, of the order of 2 cycles, in which the sluggishly acting fault-responsive relays are initially energized, before their energization is interrupted as a result of the establishment of carrier current on the protected line-section, and this initial energization is sometimes sufficient to cause the relays to continue to move, under their own momentum, so as to finally close their contacts notwithstanding the fact that their energizing coils have become deenergized. This has resulted in faulty operation, by defeating the purpose of deenergizing these sluggishly acting fault-responsive relays.

According to our present invention, we avoid the necessity for utilizing any sluggishly acting fault-responsive relay, in an intermittent carrier-current protective system, and we avoid all of the difficulties hereinabove mentioned. We utilize only instantaneously operating fault-responsive relays, that is, relays in which there is introduced no intentional time-delay, the operation under all conditions being as fast as is practically possible or economically warranted. We utilize a separate time-hesitation relay which has substantially no inertia, and which has a uniform time of operation, independent of the magnitude of the fault-current on the transmission line, for introducing a constant and definite delay or hesitation of 3 or 4 cycles, or whatever other time may be necessary in order to properly coordinate the various relaying times of the relaying system. In particular, the uniform time-delay which is introduced by our time-hesitation relay is so coordinated with the time required to complete the energization of the receiver relays, which respond to superimposed carrier, that the receiver relays will always have time to complete their response within the time provided by our time-hesitation relay. We utilize this time-hesitation relay to prevent the completion of the tripping circuit by the instantaneously operating fault-responsive relays until such time as it may be ascertained whether the receiver relays are going to operate or not, to inhibit or allow the tripping function, as the case may be.

We also preferably provide means responsive to the receipt of carrier-current by the receiver relay for thereupon opening the time-hesitation relay-contacts. Thus it is assured that the tripping function is inhibited whenever carrier current is applied to the protected line-section, that is, whenever a flowing of the current out of the line-section at one end indicates that the fault is not in that line-section, so that, if there should be a sudden reversal of fault-power thereafter, the time-hesitation relay will introduce a sufficient length of time, before completing its tripping contact, to give the receiver relay time to become energized again in response to the reestablishment of carrier current from the other end of the protected line-section.

Our reverse power protective measures, as just described, are useful also in other protective systems such as continuous carrier relaying systems.

With the foregoing and other objects in view, our invention consists in the circuits, systems, combinations, means, and methods hereinafter described and claimed and illustrated in the accompanying drawings, wherein

The invention is illustrated as being applied to one end of a line-section 3 of a three-phase synchronous transmission system, the protected line-section 3 terminating in a bus 4 at the relaying station. The rest of the transmisison system is not shown, as it is not essential to an understanding of our invention, and the other end of the protected line-section 3 is not shown, as it is a substantial duplicate of the illustrated end, so that a description of one end will suffice for both. The protected line-section 3 is provided with circuit-interrupting means in the form of a circuit breaker 5 having a trip-coil 6 and a trip-circuit conductor 7, the control of which embodies the means constituting the subject matter of the present invention.

The line 3 has superimposed thereon carrier currents of relatively high frequency, as a means for securing selective instantaneous tripping for all faults in the line-section to be protected. This carrier current is produced, at each end of the line-section, in a transmitter 11 which is indicated schematically by a rectangle, as the details of it are not necessary to an understanding of the present invention. It may be a transmitter similar to that which is shown in the application of William A. Lewis and Robert D. Evans, Serial No. 660,342, filed March 11, 1933, for Protective relay systems. The transmitter is provided with a plate circuit CR1—CR2, the opening of which instantly interrupts the transmission. The transmitter is also provided with a grid control circuit 12 which is arranged so that it may be negatively energized so as to block the oscillation of the transmitter and thus interrupt the transmission of carrier current. An opening of the grid control circuit 12 thus starts the transmission of carrier current.

The carrier-current equipment at each end of the line 3 also includes a receiver 13 which is indicated only schematically, but it may be substantially as shown and described in the aforementioned Lewis and Evans application. The receiver 13 serves to energize a receiver relay RR having one back- or break-contact 14 and two front- or make-contacts 15 and 16 the break-contact 14 being opened when the receiver relay RR is energized, and the make-contacts 15 and 16 being closed when the receiver relay RR is energized. The transmitter 11 and the receiver 13 are coupled to the transmission-line section 3 in any suitable manner, being illustrated as coupled to the phase-conductor C, by means of tap connections on an inductor or auto-transformer 17, and by means of a capacitor coupling device 18. The carrier-frequency currents are confined to the protected line-section by a carrier-frequency trap 19.

The relaying equipment utilized in the illustrated system comprises the following elements:

Two instantaneous ground overcurrent relays Io and I'o, the first one being set to pick up at a lower current than the other one. These relays constitute the means which we have shown, for illustrative purposes, as the means for responding to the presence of ground faults somewhere on the system, although it will be understood that other ground-fault responsive means may be utilized. The low-setting relay Io has a make-contact 20 and a break-contact 21. The high-setting relay I'o has a make-contact 22 and a break-contact 23.

An external ground directional relay "Ext. Gd. Dir.". This may be either of the induction-disc type or of the galvanometer type, the latter constituting the subject-matter of a Goldsborough Patent 1,934,664, patented November 7, 1933. This ground directional relay is instantaneous in its operation; that is, it operates without intentional time delay. It is provided with two back-contacts 27 and 28, and it is biased toward normal, inoperative position by means of a light restraining spring 29. Its operating torque is a power-directional torque produced by the product of ground current and residual voltage, multiplied by the sine of some predetermined angle plus the angle existing between the ground current and the residual voltage, when the current is flowing out of the protected line-section, indicating an external fault. This external ground directional relay is provided with a current winding 30 and a voltage winding 31, which are energized respectively, from the neutral circuits of a set of line-current transformers 32 and a residual potential transformer 33.

Two instantaneous unbalanced-current relays CMP and CMP', the first one being set to pick up at a lower current-unbalance than the other one. Each of these relays consists of three mechanically independent elements 34, 35, 36, and 34' 35', 36', respectively, each having a current-responsive actuating coil 37, and a current-responsive restraining coil 38, so that each element responds to the difference between two of the line-currents supplied by the current transformer 32. Each of the three elements of the low-setting instantaneous unbalanced-current relay CMP has a break-contact 40, and each of the three elements of the high-setting relay CMP' has a make-contact 41 and a break-contact 42.

Two instantaneous phase overcurrent relays Iₐ and I'ᵦ, the first one being set to pick up at a lower current than the other. These relays are energized respectively from the phase-A and phase-B line-currents supplied by the current transformer 32. The low-setting relay Iₐ is provided with a make-contact 43 and a break-contact 44. The high-setting relay I'ᵦ is provided with a make-contact 45 and a break-contact 46.

An external phase directional relay "Ext. Ph. Dir.". This relay is composed of four torque-producing elements mechanically coupled together, so that the torques add algebraically. Each torque-producing element may be of either the induction-disc type or the galvanometer type, as previously explained in connection with the ground directional relay. For convenience of illustration, the instantaneous phase directional relay is shown as comprising two discs 49 and 50 which are operated upon by four magnetic elements 51, 52, 53 and 54 of a common watt-meter type, each comprising a heavy, current-winding 55 and a voltage-winding 56. The instantaneous phase directional relay is provided with two break-contacts 57 and 58.

The external phase directional relay is normally held with its movable member against the back-contacts 57 and 58, as illustrated, by means of voltage-restraint which is provided by the wattmeter element 51. The current coil 55 of this element is energized in accordance with the phase-AC voltage of a relaying-voltage bus 63 which is illustrated as deriving its energy from any suitable line-voltage-responsive device such as the potential transformers 64, which also supply the residual-voltage transformers 33. The current coil 55 of the voltage-restraint element 51 is designed with few turns, carrying a large current, and is utilized because of its much better space-factor than is obtainable with a voltage coil, this being due to the fact that a current coil consists of a large conductor having only a few turns and very light insulation, so that much less space is taken by insulation, relative to the space occupied by copper, when a current coil is utilized. This makes it possible to utilize a smaller wattmeter element 51 than would be the case if it were provided with two voltage coils instead of one voltage coil and one current coil. In order to convert from the relatively high-voltage, low-current supply characteristic of a voltage element, which is designed to be supplied by the relaying-voltage bus 63, to the high-current, low-voltage supply characteristic of a current coil, the current coil 55 of the voltage-restraint element 51 is furnished with energy through a suitable step-down transformer 65 energized from the relaying-voltage bus 63.

The voltage coil 56 of the voltage-restraint wattmeter element 51 is energized in accordance with the phase-BC voltage of the relaying-voltage bus 63, in series with the break-contact 44 of the instantaneous phase overcurrent relay Iₐ and the three break-contacts 40 of the instantaneous unbalanced-current relay CMP, all connected in series, and it may be connected also in series with an external impedance device which may consist of a capacitor 66 and a resistor 67 which introduces a factor equal to the sine of the angle $\phi$ between the phase-AC and phase-BC voltages, so that sin $\phi$ becomes zero when the phase-AB voltage collapses.

The voltage-restraint torque produced by the wattmeter element 51 is thus the product of three factors, namely, the phase-AC voltage, the phase-BC voltage and the phase-AB voltage, so that the voltage-restraint is proportional to the area of the delta-voltage triangle of the line-voltages, and becomes zero whenever any one of these three delta-voltages becomes zero.

The power-directional torques produced by the three other wattmeter elements 52, 53 and 54 of the instantaneous phase directional relay are all in a direction to actuate the relay so as to open the break-contacts 57 and 58, when power is flowing into the line in the corresponding phase, A, B or C thereof, as will be readily understood from the connections illustrated. The wattmeter element 52, for instance, has its current coil 55 energized in accordance with the phase-A line-current, as supplied by the current transformer 32, and it has its voltage element 56 energized in accordance with the phase-BC line-voltage, as supplied by the voltage-supply bus 63.

In addition to the foregoing equipment, the following auxiliary elements are utilized.

A residual-voltage relay Vo. This relay is energized from the residual-voltage transformer 33 and has one break-contact 68 which opens instantly when a predetermined amount of residual voltage appears on the system at the relaying point.

A time-hesitation relay Y1. This relay is utilized for providing the previously described uniform time-delay for coordinating the relay timing, so as to allow a sufficient uniform time for the receiver relay RR to be energized before a trip-circuit can be completed. It is provided with one back-contact 69, and is provided with retarding means, which may be of any suitable sort, but which are illustrated conventionally by means of a dashpot 70, whereby the necessary retardation is produced in the drop-out operation of the relay, so that, when the relay has been energized, and is thereafter deenergized, a certain definite time-hesitation will be introduced before the back-contact 69 closes.

An auxiliary out-of-step relay Y2. This has one make-contact 71.

An auxiliary power-reversal relay Y3. This relay is utilized when it is desired to obtain a longer time-delay, in the event of a sudden reversal of through-power flow, than in the normal tripping functions under other conditions of operation, that is, when there is no sudden power-reversal. It is provided with one make-contact 73, and with means, symbolized by a light dashpot 74, for retarding its drop-out function, so that, when the relay is energized, with its make-contact 73 closed, this contact will remain closed for a predetermined time after the deenergization of the relay.

A back-up timer T1. This is arranged to move slowly in the actuating direction, and to return to its initial position promptly, as indicated in the showing of a dashpot 75 connected to this timer relay T1. It has one make-contact 76.

An out-of-step time lock-out relay T2. It has a drop-out time long enough to allow the two ends of the line-section to pass through their out-of-phase condition while the line-losses are being supplied by both ends, this drop-out time being possibly of the order of 10 or 15 cycles to a second, as will be subsequently described, and being obtained by means of a dashpot 81 or any other timing means. This time lock-out relay T2 is provided with one break-contact 82.

It is utilized in connection with the means subsequently described for affording protection in the event that the two ends of the protected line-section 3 fall out-of-step with each other.

An out-of-step auxiliary relay Z3. This relay has one make-contact 83 and one break-contact 84.

A test push button 85. This has one normally closed back-contact 86 and a normally open front-contact 87, the latter being closed when the push button is depressed.

An auxiliary test-circuit relay X. This is instantaneous in its action and has one make-contact 88.

Two auxiliary switches 89 and 90. These auxiliary switches are mounted on the operating mechanism of the circuit breaker 5 and are both arranged to be closed when the circuit breaker is closed, and to be opened when the circuit breaker opens.

A contactor CS. This is for the purpose of by-passing the light relay-contacts which initially energize the trip-coil circuit 7, so as to prevent damage due to the heavy tripping current. This contactor CS has its operating coil 91 connected in series with the trip-coil 6 of the circuit breaker, and it has one make-contact 92 which seals-in the contactor and keeps the trip-circuit 7 energized until the current is finally interrupted by the auxiliary switch 90 on the breaker.

Figure 1:
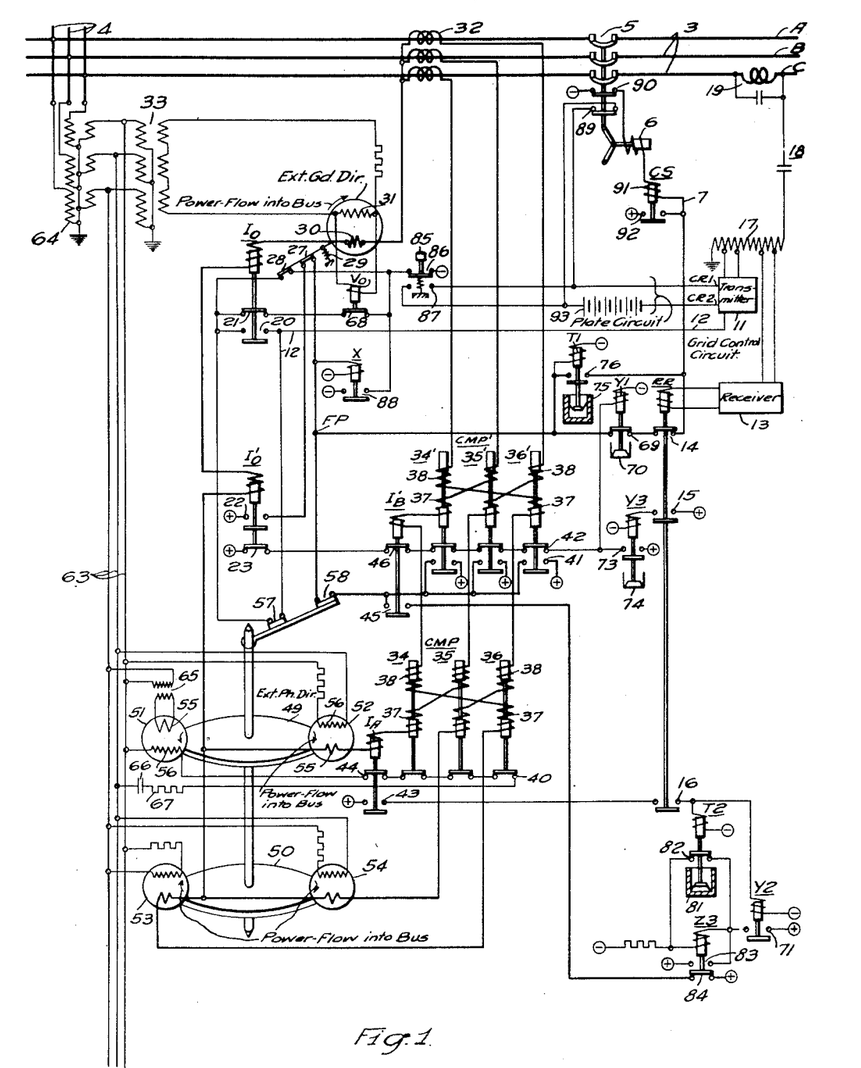
Figure 1 is a diagrammatic view of circuits and apparatus embodying our invention in an illustrative form.
Figure 2:
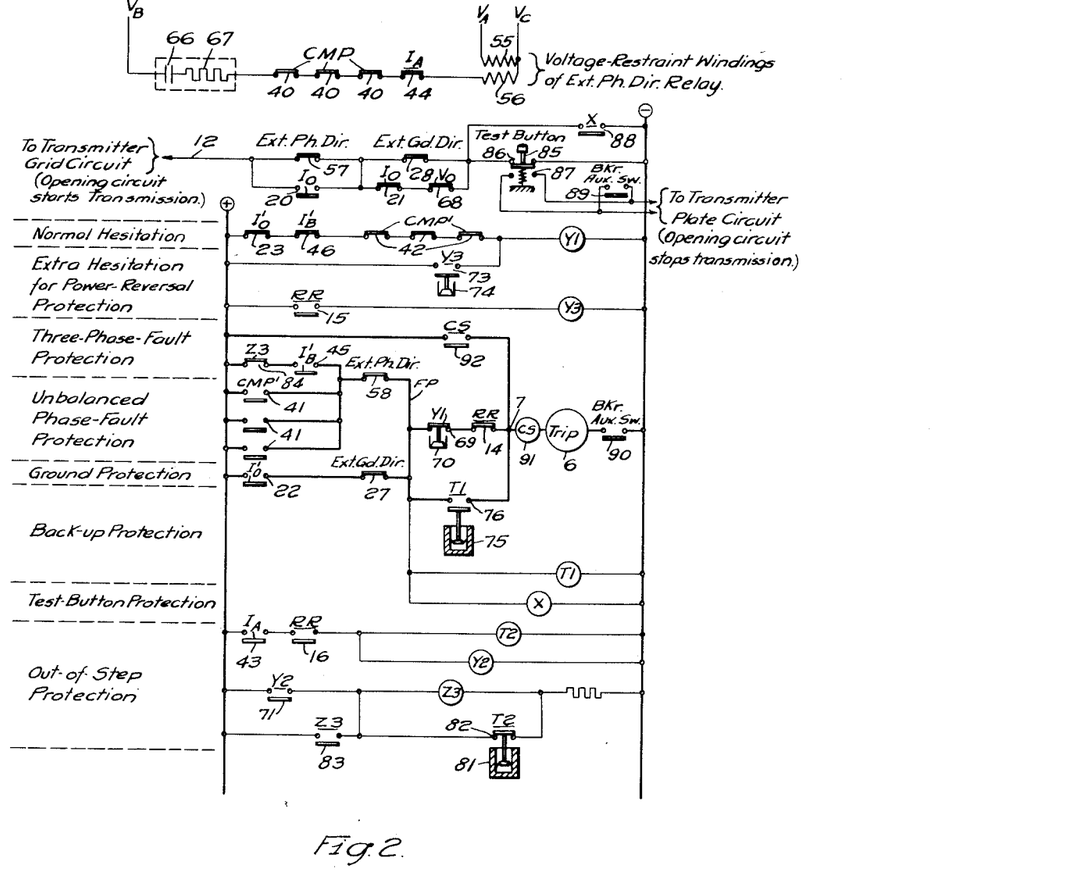
Fig. 2 is a corresponding schematic or across-the-line diagram of the same system.

The circuit connections of the above-described equipment are all shown in Fig. 1 and are summarized also in the schematic diagram of Fig. 2, which may be referred to for convenience in tracing out the operation of the apparatus.

Normally the instantaneous unbalanced-current relays CMP and CMP' and the instantaneous phase over-current relays $I_A$ and $I'_B$ are in their deenergized positions, with their back-contacts 40 and 44 closed, thus maintaining voltage-restraint on the external phase directional relay "Ext. Ph. Dir." at each end of the line-section 3. The voltage-restraint is sufficient to prevent the power-directional torques produced by normal loads from operating this external phase-directional relay, so that the relay-contacts 57 and 58 are normally closed as shown.

Similarly, the external ground directional relay "Ext. Gd. Dir." is normally deenergized by reason of the absence of residual power, as are also the ground overcurrent relays $I_0$ and $I'_0$, and the residual voltage relay Vo, so that the contacts of these relays are also in the position shown, and this holds true for both ends of the line-section 3.

The transmitter plate circuit CR1—CR2 in Fig. 1 includes a plate battery 93, or other source of plate-circuit voltage, and is normally closed by the auxiliary switch 89 on the circuit breaker 5, the latter being indicated also in Fig. 2. As long as this plate circuit is energized, the transmitter 11 is in condition for transmission, provided that transmission is not stopped by other means which will be referred to presently. It will be understood, of course, that if the plate circuit is opened, the transmitter cannot transmit carrier-frequency current.

The transmitter 11 is also provided with a grid control circuit 12, which is normally negatively biased, by means of connections which are summarized in Fig. 2, so that oscillation of the transmitter is blocked and the transmitter is thus prevented from transmitting carrier-frequency currents to the protected line-section 3. As shown in Fig. 2, the grid control circuit 12 is normally connected to the negative relaying bus (—) through the back-contact 57 of the external phase-directional relay, in series with the back-contact 28 of the external ground directional relay, and in series with the back-contact 86 of the test button 85. Opening this grid control circuit 12 instantly starts the oscillation of the transmitter 11 so that it transmits its carrier-frequency signalling current to the protected line-section 3.

As will be explained more in detail later on, the external-directional relays open their contacts 57 and 28, respectively, only upon the occurrence of a fault-indication which points to the presence of a fault external of the protected line-section, that is, a fault somewhere on the transmission system but not in the protected line-section.

In Fig. 2, under the head of "Normal hesitation", we have shown an illustrative means for controlling our time-hesitation relay Y1 which comprises one of the principal novel features of our present invention. It will be remembered that we utilize this relay for the purpose of obtaining a definite and constant uniform time-delay, of from 3 to 5 cycles or any other time which may be necessary in order to properly coordinate the various relaying times, and to make sure that the receiver relay RR shall have time to operate, in response to transmitted carrier current, as will be hereinafter pointed out. As shown in Fig. 2, the time-hesitation relay Y1 is normally energized through the back-contacts 23, 46 and 42, respectively, of the high-setting ground overcurrent relay I'o, the high-setting phase overcurrent relay I'B and the high-setting unbalanced-current relays CMP'. Thus, as soon as any kind of fault appears on the transmission system, involving current of fault magnitude at the relaying point, at least one of these back-contacts opens and deenergizes the time-hesitation relay Y1.

In Fig. 2, the next item after "Normal hesitation" is indicated under the head of "Extra hesitation for power-reversal protection". This consists of the delayed-action auxiliary power-reversal relay Y3 which is energized by the make-contact 15 of the receiver relay RR. Thus, the auxiliary power-reversal relay Y3 is energized whenever carrier-frequency current is transmitted, in response to what we call an external fault, that is, an indication of a fault which is external of the protected line-section 3. When the auxiliary power-reversal relay Y3 is energized, it closes its make-contact 73 and provides a second energizing circuit for the time-hesitation relay Y1. If power suddenly reverses during the clearing of a fault in another line-section, other than the protected line-section 3, the make-contact 73 of the auxiliary power-reversal relay Y3 does not instantly drop out, but drops out only after a time-hesitation of a predetermined number of cycles, which is secured by the dashpot 74 or any other means for delaying the action, thus maintaining the energization of the time-hesitation relay Y1 for that length of time after the reversal of power.

In Fig. 2, under the head of "Three-phase-fault protection", a circuit is provided from the positive bus (+), through the break-contact 84 of the auxiliary out-of-step relay Z3, in series with the high-setting I'B make-contact 45, thence through the external phase-directional break-contact 58, to an auxiliary fault-responsive positive bus FP. From the auxiliary fault-responsive positive bus FP, a circuit is continued through the back-contact 69 of the time-hesitation relay Y1, and the back-contact 14 of the receiver relay RR, to the trip circuit 7, from which the circuit continues through the operating coil 91 of the contactor CS, the trip coil 6 of the circuit breaker 5, and the auxiliary switch 90 carried by the circuit-breaker operating mechanism. Normally, the back-contact 84 of the auxiliary out-of-step relay Z3 is closed. The operation of this relay Z3 will be described subsequently under the head of "Out-of-step protection". The I'B relay-contact 45 closes, of course, only when there is phase-to-phase current of fault magnitude flowing in the protected line-section, in either direction, that is, either flowing into the line-section 3 from the bus 4, or vice versa. The external phase directional relay-contact 58 is normally closed and does not open except in response to fault-current conditions accompanied by current flowing out of the protected line-section 3 at the relaying point, indicating that the fault must be external of the protected line-section. The time-hesitation relay-contact 69 is normally open, because the time-hesitation relay Y1 is normally energized, as shown under the heading "Normal hesitation".

When there is phase-to-phase current of fault magnitude, the I'B relay-contact 45 closes, thus completing a partial tripping circuit, energizing the auxiliary fault-responsive positive bus FP. At the same time, the I'B back-contact 46 opens, deenergizing the time-hesitation relay Y1, and starting the latter relay in motion, so that, after a predetermined time-hesitation of 3 to 5 cycles, or other predetermined time, the time-hesitation back-contact 69 is closed, but only after a time-delay which is sufficient to give the receiver relay RR time to pick up and open its back-contact 14 in the tripping circuit. Normally, this receiver-relay back-contact 14 is closed and it is opened only in response to the transmission of carrier current, which is brought about if the fault is external to the protected line-section, so that the tripping of the circuit breaker 5 will be inhibited if the fault is not in the protected line-section, but will not be inhibited if the fault is in the protected line-section.

In Fig. 2, under the heading "Unbalanced phase-fault protection", another partial tripping circuit is shown as extending from the positive bus through any one of the three parallel-connected make-contacts 41 of the high-setting unbalanced-current relays CMP', and thence through the external phase-directional contact 58 to the auxiliary fault-responsive positive bus FP, from which the tripping circuit is completed as previously explained.

Since the CMP' relay responds to any phase-to-phase fault which is unbalanced, the I'B relay is relied upon, to respond, only in the event of a balanced or three-phase fault involving all of the phase-conductors of the three-phase line. Since the unbalanced-current relay CMP' takes care of all phase-to-phase faults except those involving equal currents in all three-phase conductors, it is not necessary to have an overcurrent phase-fault-responsive relay such as I'B in more than just the one phase conductor, in order to afford the protection desired.

In Fig. 2, under the heading of "Ground protection", a third partial tripping circuit is shown as extending from the positive bus, through the make-contact 22 of the high-setting ground overcurrent relay I'o and the break-contact 27 of the external ground directional relay, to the auxiliary fault-responsive positive bus FP from which the circuit is continued, as pointed out above.

The normal operation of our relaying system will now be outlined more in detail.

When there is a fault involving ground, the instantaneous ground overcurrent relays Io and I'o in the line-sections adjacent to the fault will operate, closing their make-contacts 22 and 20 and opening their break-contacts 21 and 23. The make-contact 20 of the low-setting relay Io bypasses the external phase-directional relay-contact 57, thus giving preference to the ground relays in the control of the carrier current. This preference is desirable because load power may flow past a single line-to-ground fault, to a load beyond the fault, in sufficient amount to overbalance the torque due to the fault current, thus making it possible for one or more of the phase directional relays "Ext. Ph. Dir." which are located at various points on the system to give an incorrect indication of the fault direction under this condition. Thus, if this ground-fault preference is not inserted by the ground-current-responsive make-contact 20, the improper opening of one of the phase directional relay contacts 57 in any line-section would result in the transmission of carrier current at a point where it should be prevented in order to provide correct relaying.

This improper operation of the phase-directional relay "Ext. Ph. Dir." is made possible by reason of the fact that a high value of ground current in one phase may actuate one or more of the I_A or CMP relay elements in series with the voltage-restraint winding 56 of the wattmeter element 51, and thus remove the voltage-restraint from the phase directional relay, allowing it to be operated by the load power, and if the fault is not in the line-section in question, the load power will be flowing into the line at one end and out of the line at the other, so that improper operation will be obtained at one end.

In case a ground fault occurs in the protected line-section 3, the ground overcurrent relays Io and I'o will be operated at both ends of the section. The ground directional relays "Ext. Gd. Dir." will not be operated at either end, thus maintaining the negatively biased grid circuits of the carrier-current transmitters, and keeping the transmission blocked at both ends of the protected line-section. This causes the receiver relays RR at both ends to remain deenergized, thus keeping their back-contacts 14 closed and completing the trip-circuit through the contacts 22 and 27 of the high-setting ground overcurrent relay I'o and the ground directional relay "Ext. Gd. Dir." at each end of the line.

If a fault involves more than one phase-conductor, and the ground fault-current is insufficient to operate the low-setting ground overcurrent relay Io, the control of the carrier-current transmission resides in the phase directional relay "Ext. Ph. Dir." If the fault is in the protected line-section 3, the phase directional relay at each end of the section will remain unresponsive, thus keeping its back contact 57 closed, and maintaining the negative bias on the grid circuit 12, which prevents the transmission of carrier current. Thus the receiver relays RR at both ends of the protected line-section will remain deenergized, keeping their back-contacts 14 closed and completing the trip circuit, in this case, through the contact 58 of the phase-directional relay and the contacts 41 or 45 of the high-setting unbalanced-current relay CMP' or the high-setting phase-overcurrent relay I'_B, according as the fault is an unbalanced fault or a three-phase fault.

In the case of an external ground fault, that is, where the fault is located externally of the protected line-section 3, there will usually be ground current flowing in the direction from the protected line-section to the bus at at least one end of the protected line-section. Assuming that this is the end shown in the drawings, it will be observed that the ground current appears to be flowing out of the protected line-section and thus energizes the external ground directional relay, opening its contact 28, and interrupting the transmitter grid circuit 12, thus instantly starting the transmission of carrier current at the illustrated end of the protected line-section 3. This will cause the energization of the receiver relays RR at both ends of the protected line-section, and will open the tripping circuit at the back-contacts 14 of the receiver relays at both ends of the protected line-section. All this will occur within the time-hesitation period which is provided by our Y1 relay.

Owing to the extreme sensitivity of the external ground directional relay, it is sometimes hard to so adjust it that it will not respond to stray residual voltages that may occur on the transmission system or in the relay voltage bus at times when there is not an external fault on the system. In order to prevent this ground directional relay from applying carrier current to the protected line-section in response to very slight residual voltages which do not indicate the presence of a ground-fault, we may, as shown in Figs. 1 and 2, shunt the external ground directional back-contact 28, with a shunting circuit including the back-contact 21 of the low-setting ground overcurrent relay Io, and the back-contact 68 of the residual voltage relay Vo. It is easy to give the residual voltage relay Vo such a setting that it will not respond to the stray residual voltages under such circumstances, and will thus prevent the opening of the transmitter grid circuit 12 by the improper operation of the external ground directional relay under these conditions. In normal ground-fault-responsive operation, there will be both ground current and residual voltage, which will cause the instant opening of both of the shunting relay-contacts 21 and 68, whenever there is a ground-fault, either external or internal. In case there is no ground current of fault magnitude, the shunt current-responsive contact 21 will not open, and the shunt voltage-responsive contact 68 will open only in case there is residual voltage of a magnitude which is really great enough to indicate the presence of an external fault.

In the case of an external fault involving more than one conductor, and if the ground fault-current is insufficient to operate the low-setting ground overcurrent relay Io, the control of the carrier-current transmission resides in the external phase directional relay. The voltage-restraint on this relay will be substantially removed or reduced to a low value, because one or more of the phases of the delta voltage will be reduced to a small value. More rapid and positive action is usually obtained, however, in the removal of voltage restraint, by the opening of the voltage-restraint torque-producing circuit, by means of one of the back-contacts 40 or 44 of the low-setting unbalanced current relay CMP or the low-setting phase overcurrent relay I_A, which is instantaneously accomplished upon the flow of phase current of fault magnitude, in either direction.

In the usual case of an external phase fault, there will be phase currents of fault magnitude flowing out of the protected line-section at one end thereof, thereby producing phase directional torque in the wattmeter elements 52, 53 and 54, or some of them, and operating the external phase directional relay at that end, thus opening the back-contact 57, which opens the negatively biased grid circuit 12 and instantly starts the oscillation of the transmitter 11 at that end of the protected line-section. This energizes the receiver relays RR at both ends, and opens each trip circuit at the back-contact 14 of the receiver relay, thus preventing tripping at both ends, this being accomplished before the time-hesitation relay-contact 69 closes.

Referring to Fig. 2, under the heading of "Back-up protection", it will be noted that we have provided a back-up timer T1 which is energized whenever the auxiliary fault-responsive positive bus FP is energized. It will be noted that this bus is energized whenever there is current of fault magnitude, not accompanied by an indication of an external fault.

If it were not for our use of the back-up timer T1, it would not be necessary to utilize the directional-relay contacts 58 and 27 which prevent the energization of the auxiliary fault-responsive positive bus FP when there is an external phase- or ground-fault on the system, because, so far as the normal tripping circuit is concerned, a tripping operation in the event of an external fault is prevented by the carrier-current channel and by the coordinated responses of the time-hesitation relay Y1 and the receiver relay RR.

When back-up protection is utilized, however, a tripping operation is provided, after a suitable time delay, independently of the condition of the carrier-current communication channel, so that it is necessary to make provision that the back-up timer T1 shall not be energized except in the event of an internal fault.

As shown in Fig. 2, the energization of the back-up timer T1 causes it to instantly begin to close its front-contact 76, but by reason of the heavy dashpot 75, or other retarding means, this front-contact 76 is not closed until after a considerable time-delay which will be sufficient to permit the fault to be cleared in some other line-section, by the normal protective apparatus therein, if it is going to be cleared at all by such normal protective apparatus, such as the protective circuits which have been previously described. In case something should be wrong with any of the protective apparatus in the external line-section in which a fault may occur, or in the protected line-section itself, back-up protection is eventually afforded by the closing of the back-up timer contact 76, which completes a circuit from the auxiliary fault-responsive positive bus FP to the tripping circuit 7, and thereby trips the circuit breaker 5. This action occurs at each end of the protected line-section.

In view of the fact that the carrier-current transmitter operates only intermittently, in response to a fault which is external of the protected line-section, there is the disadvantage that, in case anything should be wrong with either the transmitter or the receiver, that fact would not normally be known until a fault occurred, involving an improper relaying operation. We have shown, therefore, in the transmitter circuit, a test pushbutton 85 which, when depressed, interrupts the transmitter grid circuit 12 at 86, and insures the completion of the transmitter plate circuit at 87, thus transmitting a carrier-current signal, which, if all of the apparatus is working properly, will be received at both ends of the protected line-section.

In case a fault should occur while the carrier transmission is being tested by the test button 85, means should be provided for insuring proper relaying operations, and this is accomplished, as shown in Fig. 2 under the heading of "Test button protection", by our auxiliary relay X which is energized whenever the auxiliary fault-responsive positive bus FP is energized, thus closing a contact 88 which short circuits the back-contact 86 of the test button 85, and restoring control of the transmitter to the external directional relays.

Out-of-synchronism conditions have, in times past, presented a difficulty, in any kind of pilot relaying, whether utilizing continuous carrier, intermittent carrier, or pilot wires, because, at one or more points in the transmission system, which are called electrical centers, it may appear that power is flowing momentarily into these points just as if there were a three-phase fault at each of these points, so that any relaying system responsive to three-phase faults would respond to such out-of-synchronism conditions so as to trip out the line-sections containing these electrical centers of the distribution system. In the relaying system shown in the drawings, means have been provided for affording out-of-step protection, and preventing faulty relaying operations under these conditions. Said means, and the method of operation involved thereby, constitute the subject matter of an application of William A. Lewis, Serial No. 703,606, filed December 22, 1933, for Out-of-step protection. In order to make the description of the entire relaying system complete in this application, the following description of the out-of-step protection is included.

During the early stages of out-of-step operation, the two ends of each line-section begin gradually to swing apart in phase, increasing the phase-angle between the two ends until exact phase opposition is reached at 180°, and then on through to 360°, and then repeating the cycle, requiring a time which may be of the order of a second or several seconds to complete a cycle, dependent upon the system-constants and the operating conditions of the system.

Out-of-synchronism conditions are recognized by the fact that, during the early stages, power flows through each line-section from one end to the other in a manner similar to an external fault, the current increasing from load-magnitude to fault-magnitude as loss of synchronism is approached. As the power-sources feeding the two ends of the line-section reach approximate phase-opposition, there will be no change in power-flow in those sections which do not contain an electrical center.

But where an electrical center of the system falls in any particular line-section, there will be a brief period in the out-of-synchronism cycle of the transmission system, lasting from just before until just after the approximate 180° phase position is reached, when the losses of the line are being supplied at both ends of the line-section, so that power of fault-magnitude flows into such a line-section from both ends, thus momentarily simulating an internal three-phase fault. This is a condition of unstable equilibrium and will not be maintained, returning again to a through-power condition, with power flowing in at one end and out at the other end of the line-section, soon after the condition of exact phase-opposition is past, so that if the tripping sequence of the three-phase fault-responsive devices is momentarily opened by a time-delay relay energized before the condition of phase-opposition is reached, tripping will be prevented.

In the illustrated relaying system, as the two sources pull out of synchronism, power flows through the relayed section 3 at the same time that current of fault-magnitude is approached. Under this condition, the voltage restraint is removed from the phase directional relay, and carrier is supplied to the protected line-section at the end where power flows out of the section. This condition is recognized by the continuance of a three-phase overcurrent for a time long enough for the fault to have been cleared, wherever it was, if the overcurrent had been caused by a fault anywhere on the system.

Referring to Fig. 2 under the heading of "Out-of-step protection", it will be noted that an out-of-step time lock-out relay T2 and two auxiliary out-of-step relays Y2 and Z3 are provided. If the receiver relay RR is energized at a time when there is balanced three-phase current flowing in the protected line-section, the respective relay-contacts 16 and 43 of the receiver relay RR and the low-setting phase overcurrent relay IA will both be closed, thus energizing the operating coils of both the out-of-step time lock-out relay T2 and the auxiliary relay Y2. The time lock-out relay T2 picks up almost instantly, opening its back-contact 82, and removing a short circuit from the operating coil of the auxiliary out-of-step relay Z3. The auxiliary out-of-step relay Y2 picks up and closes its front-contact 71, thereby energizing the auxiliary out-of-step relay Z3 as soon as the short-circuit 82 is removed therefrom by the time lock-out relay T2. As soon as the auxiliary relay Z3 picks up, it closes a holding circuit for itself, through its front-contact 83, and at the same time it opens its back-contact 84 which is in series with the high-setting phase-current-responsive trip-circuit contact 45, so that the tripping circuit cannot thereafter be closed at the moment when balanced three-phase current seems to be flowing into the protected line-section simultaneously at both ends by reason of the out-of-synchronism operating conditions.

If there is not an electrical center in the protected line-section 3, the receiver-relay front-contact 16 will remain closed throughout the out-of-synchronism condition, and the overcurrent IA relay-contact 43 will remain closed until near the end of the out-of-synchronism cycle, when the two sources at the two ends of the line will again approach in-phase position. As the two sources vary in speed, they will change successively from in-phase position to out-of-phase position, resulting respectively in the alternate deenergization and energization of the Y2 relay, following the slip frequency. There is no need for out-of-step protection under these circumstances, because we have assumed a line-section in which there is no electrical center and hence in which there is never a condition of the simultaneous flowing of power of fault-magnitude into both ends of the line-section.

If an electrical center of the transmission system should fall within the line-section 3 being protected, there will be a brief time, near the condition of exact phase-opposition of the two sources, when power of fault-magnitude will flow into both ends of the line-section, thus closing both of the external phase-directional relays at the two ends of the line-section, and interrupting carrier-current transmission at both ends, so that each of the receiver relays RR is deenergized. The deenergization of the receiver relay RR opens its contact 16 and deenergizes both the Y2 relay and T2 time lock-out relay.

The T2 relay then starts to drop out, and its drop-out time must be of the order of 10 or 15 cycles to a second, or long enough to permit riding over that portion of the out-of-step cycle in which the relaying conditions are similar to an internal three-phase fault, or until a phase directional relay at one end of the line-section again registers power flowing out of the line-section, thus restoring carrier-current transmission to one end of the line-section, and picking up the receiver relays RR at both ends of the line-section. At this time, the T2 relay is again energized, moving its back-contact 82 wide open again, before it had had time to become closed. The T2 timing relay will thus be kept in its energized, or contact-open, position, and its back-contact 82 will not close during the out-of-synchronism condition. As long as the T2-relay back-contact 82 does not close, the Z3 relay will remain energized and will, in turn, prevent tripping by reason of its open back-contact 84 in the tripping circuit of the three-phase fault-responsive device.

It is recognized that an out-of-step condition may simulate a three-phase fault not involving grounds and that, therefore, the unbalanced-current fault-responsive relay, as well as the ground protection, will not be involved. Reference to Figs. 1 and 2 of the drawings will show that the Z3 relay-contact 84 in series with only that portion of the tripping circuit which is responsive to three-phase faults. It does not interfere with the response to unbalanced phase faults or ground faults. Thus, if either a ground fault or an unbalanced phase fault should occur during out-of-synchronism conditions, the fault will be cleared instantly, just as if the out-of-synchronism condition did not exist. If a three-phase fault should occur during out-of-synchronism conditions, it cannot be cleared until the T2 timer closes its back contact 82, thereby short-circuiting the operating coil of the Z3 relay and closing the back-contact 84 of the latter. This would involve the time-delay which is inherent in the drop-out time of the T2 timing relay.

It will be noted that two sets of fault-responsive relays are provided, with different settings. Our low-setting relays IA, CMP and Io, are utilized to start the carrier current, and our high-setting relays I'B, CMP' and I'o are utilized for tripping the circuit breakers 5 at the two ends of the protected line-section 3. The corresponding low-setting relays IA, CMP and Io at the two ends of the line-section have as nearly the same setting as possible, but there is bound to be an occasional border-line case of an external fault with such weak current that it will pick up the corresponding relay IA, CMP, or Io at one end but not at the other. Thus, if an attempt were made to perform both the carrier-control and tripping functions by a single set of relays, the relay that should start carrier-current transmission at the end where current is leaving the line would, in rare instances, fail to operate, thereby permitting faulty tripping operation at the other end. Our use of a separate set of tripping relays, adjusted so that they will not respond in such border-line cases, obviates the possibility of such faulty operation.

While we have shown our invention in a preferred form of embodiment, it will be understood that we have merely illustrated the general principles of application thereof, and that many changes in details may be made by those skilled in the art, without departing from the essential spirit and intent of our invention. We desire, therefore, that the appended claims shall be accorded the broadest interpretation consistent with their language and the prior art.

We claim as our invention:

1. Protective equipment for a line-section of a transmission-line system, comprising line-sectionalizing circuit-interrupter means and relaying means at each end of the line-section being protected, and means for providing a communicating channel between the ends of the protected line-section, each of said relaying means including a trip-circuit means for the circuit-interrupter means, a normally inoperative transmitter means capable of transmitting an effective signal to said communicating channel, a normally inoperative receiver relay capable of receiving and responding to said signal, a uniform-time relay, means responsive to the existence of an external fault which is somewhere on the transmission system, but not in the protected line-section, for setting said signal-transmitting means in operation, and for setting said uniform-time relay in operation, and for completing a partial circuit in said trip-circuit means, means responsive to the energization of said receiver relay for interposing a break in the trip-circuit, and means responsive to the operation of said uniform-time relay for removing a break from the trip-circuit.

2. Protective equipment for a line-section of a transmission-line system, comprising line-sectionalizing circuit-interrupter means and relaying means at each end of the line-section being protected, and means for providing a communicating channel between the ends of the protected line-section, each of said relaying means including a trip-circuit means for the circuit-interrupter means, a normally inoperative transmitter means capable of transmitting an effective signal to said communicating channel, a normally inoperative receiver relay capable of receiving and responding to said signal, a uniform-time relay, a directional fault-responsive means for setting said signal-transmitting means in operation in response to the existence of an external fault which is somewhere on the transmission system but not in the protected line-section, a fault-responsive means for setting said uniform-time-relay in operation, a fault-responsive means for completing a partial circuit in said trip-circuit means, means responsive to the energization of said receiver relay for interposing a break in the trip-circuit, and means responsive to the operation of said uniform-time relay for removing a break from the trip-circuit.

3. Protective equipment for a line-section of a transmission-line system, comprising line-sectionalizing circuit-interrupter means and relaying means at each end of the line-section being protected, and means for providing a communicating channel between the ends of the protected line-section, each of said relaying means including a trip-circuit means for the circuit-interrupter means, a normally inoperative transmitter means capable of transmitting an effective signalling current to said communicating channel, a normally inoperative receiver relay capable of receiving and responding to said signalling current, a normally energized time-hesitation relay having a substantially uniform drop-out time after which a back-contact is closed, and means responsive to the existence of an external fault which is somewhere on the transmission system, but not in the protected line-section, for setting said transmitter-means in operation, and for deenergizing said time-hesitation relay, and for completing a partial circuit in said trip-circuit means, said trip-circuit means including a normally closed receiver-relay-responsive contact which is opened when said receiver relay is energized by said signalling current, said trip-circuit means including the back-contact of said time-hesitation relay.

4. Protective equipment for a line-section of a transmission-line system, comprising line-sectionalizing circuit-interrupter means and relaying means at each end of the line-section being protected, and means for providing a communicating channel between the ends of the protected line-section, each of said relaying means including a trip-circuit means for the circuit-interrupter means, a normally inoperative transmitter means capable of transmitting an effective signalling current to said communicating channel, a normally inoperative receiver relay capable of receiving and responding to said signalling current, a normally energized time-hesitation relay having a substantially uniform drop-out time after which a back-contact is closed, a directional fault-responsive means for setting said transmitter-means in operation in response to the existence of an external fault which is somewhere on the transmission system but not in the protected line-section, a fault-responsive means for deenergizing said time-hesitation relay, and a fault-responsive means for completing a partial circuit in said trip-circuit means, said trip-circuit means including a normally closed receiver-relay-responsive contact-means which is opened when said receiver relay is energized by said signalling current, said trip-circuit means including the back-contact of said time-hesitation relay.

5. Protective equipment for a line-section of a transmission-line system, comprising line-sectionalizing circuit-interrupter means and relaying means at each end of the line-section being protected, and means for providing a communicating channel between the ends of the protected line-section, each of said relaying means including a trip-circuit means for the circuit-interrupter means, a transmitter means capable of transmitting an effective signalling current to said communicating channel, a receiver relay capable of receiving and responding to said signalling current, a uniform-time relay, a directional fault-responsive means for setting said transmitter-means in operation in response to a predetermined fault-indication, two different electro-responsive means responsive to different conditions of the system, one of said electro-responsive means tending to set said uniform-time relay in motion and the other tending to maintain it in its normal initial position, and a fault-responsive means for completing a partial circuit in said trip-circuit means, said trip-circuit means including a receiver-relay-responsive contact-means, said trip-circuit means including a normally open time-relay-responsive contact-means which is closed, after a uniform time-delay, by the operation of said uniform-time relay.

6. Protective equipment for a line-section of a transmission-line system, comprising line-sectionalizing circuit-interrupter means and relaying means at each end of the line-section being protected, and means for providing a communicating channel between the ends of the protected line-section, each of said relaying means including a trip-circuit means for the circuit-interrupter means, a transmitter means capable of transmitting an effective signalling current to said communicating channel, a receiver relay capable of receiving and responding to said signalling current, a uniform-time relay, a directional fault-responsive means for setting said transmitter-means in operation in response to a predetermined fault-indication, two different electro-responsive means responsive to different conditions of the system, one of said electro-responsive means tending to set said uniform-time relay in motion and the other tending to maintain it in its normal initial position, and a fault-responsive means for completing a partial circuit in said trip-circuit means, said trip-circuit means including a receiver-relay-responsive contact-means, said trip-circuit means including a time-relay-responsive contact means.

7. Protective equipment for a line-section of a transmission-line system, comprising line-sectionalizing circuit-interrupter means and relaying means at each end of the line-section being protected, and means for providing a communicating channel between the ends of the protected line-section, each of said relaying means including a trip-circuit means for the circuit-interrupter means, a transmitter means capable of transmitting an effective signalling current to said communicating channel, a receiver relay capable of receiving and responding to said signalling current, a uniform-time relay, a directional fault-responsive means for setting said transmitter-means in operation in response to a predetermined fault-indication, electro-responsive means responsive to a predetermined condition for controlling said uniform-time relay, and a fault-responsive means for completing a partial circuit in said trip-circuit means, said trip-circuit means also including a receiver-relay-responsive contact-means, said trip-circuit means including a time-relay-responsive contact-means.

8. Protective equipment for a line-section of a transmission-line system, comprising line-sectionalizing circuit-interrupter means and relaying means at each end of the line-section being protected, and means for providing a communicating channel between the ends of the protected line-section, each of said relaying means including a directionally responsive relaying means for responding selectively to faults, means for providing an intelligence-communicating channel between the two ends of the line-section being protected, auxiliary means associated with said intelligence-communicating channel for selectively cooperating with said directionally responsive means at the two ends of the protected line-section so as to provide two different indications, one indication of the presence of an internal fault somewhere between the ends of the protected line-section, and the other indication of the presence of an external fault somewhere on the transmission system but not in the protected line-section, trip-circuit means, at each end, for actuating the circuit-interrupter means at its end of the protected line-section, said trip-circuit means being responsive to said internal-fault communicating-channel indication, a time-hesitation relay associated with each trip-circuit means, and means responsive to said external-fault communicating-channel indication for so operating upon said time-hesitation relay as to introduce a delay in the immediate operation of the trip-circuit means in response to an internal-fault indication immediately following an external-fault indication.

9. Protective equipment for a line-section of a transmission-line system, comprising line-sectionalizing circuit-interrupter means and relaying means at each end of the line-section being protected, and means for providing a communicating channel between the ends of the protected line-section, each of said relaying means including a trip-circuit means for the circuit-interrupter means, a transmitter means capable of transmitting an effective signalling current to said communicating channel, a receiver relay capable of receiving and responding to said signalling current, a time-hesitation relay, a directional fault-responsive means for setting said transmitter-means in operation in response to a predetermined fault-indication, and a fault-responsive means for completing a partial circuit in said trip-circuit means, said trip-circuit means including a receiver-relay-responsive contact-means which is closed in response to a signalling-current condition indicative of the presence of an internal fault somewhere between the ends of the protected line-section, and which is opened in response to a signalling-current condition indicative of the presence of an external fault somewhere on the transmission system but not in the protected line-section, said trip-circuit means including a time-hesitation relay-contact-means, and means including a receiver-relay-responsive contact-means for so controlling said time-hesitation relay that said time-hesitation relay-contact is opened in response to a signalling-current condition indicative of the presence of an external fault somewhere on the transmission system but not in the protected line-section, and that it is closed thereafter only after a time-delay.

10. Protective equipment for a line-section of a transmission-line system, comprising line-sectionalizing circuit-interrupter means and relaying means at each end of the line-section being protected, and means for providing a communicating channel between the ends of the protected line-section, each of said relaying means including a trip-circuit means for the circuit-interrupter means, a normally inoperative transmitter means capable of transmitting an effective signalling current to said communicating channel, a normally inoperative receiver relay capable of receiving and responding to said signalling current, a time-hesitation relay, and means responsive to the existence of an external fault which is somewhere on the transmission system, but not in the protected line-section, for setting said transmitter-means in operation, fault-responsive means for so controlling said time-hesitation relay that a previously open contact thereof is closed after a time-delay, and fault-responsive means for completing a partial circuit in said trip-circuit means, said trip-circuit means including a receiver-relay-responsive contact-means which is opened when said receiver relay is energized by said signalling current, said trip-circuit means including said previously open contact of said time-hesitation relay, and means including a receiver-relay-responsive contact-means for so controlling said time-hesitation relay that said previously open contact thereof is opened when said receiver relay is energized by said signalling current.

11. Protective equipment for a line-section of a transmission-line system, comprising line-sectionalizing circuit-interrupter means and relaying means at each end of the line-section being protected, and means for providing a communicating channel between the ends of the protected line-section, each of said relaying means including a trip-circuit means for the circuit-interrupter means, a normally inoperative transmitter means capable of transmitting an effective signalling current to said communicating channel, a normally inoperative receiver relay capable of receiving and responding to said signalling current, a time-hesitation relay, and means responsive to the existence of an external fault which is somewhere on the transmission system, but not in the protected line-section, for setting said transmitter-means in operation, fault-responsive means for so controlling said time-hesitation relay that a previously open contact thereof is closed after a time-delay, and fault-responsive means for completing a partial circuit in said trip-circuit means, said trip-circuit means including a receiver-relay-responsive contact-means which is opened when said receiver relay is energized by said signalling current, said trip-circuit means including said previously open contact of said time-hesitation relay, and means including a receiver-relay-responsive contact-means for so controlling said time-hesitation relay that said previously open contact thereof is opened when said receiver relay is energized by said signalling current and for a predetermined time after said receiver relay ceases to be energized by said signalling current.

12. Protective equipment for a line-section of a transmission-line system, comprising line-sectionalizing circuit-interrupter means and relaying means at each end of the line-section being protected, and means for providing a communicating channel between the ends of the protected line-section, each of said relaying means including a trip-circuit means for the circuit-interrupter means, a normally inoperative transmitter means capable of transmitting an effective signalling current to said communicating channel, a normally inoperative receiver relay capable of receiving and responding to said signalling current, a normally energized time-hesitation relay having a substantially uniform drop-out time after which a back-contact is closed, and means responsive to the existence of an external fault which is somewhere on the transmission system, but not in the protected line-section, for setting said transmitter-means in operation, fault-responsive means for deenergizing said time-hesitation relay, and fault-responsive means for completing a partial circuit in said trip-circuit means, said trip-circuit means including the back-contact of said time-hesitation relay, and means including a receiver-relay-responsive contact-means for insuring the energization of said time-hesitation relay notwithstanding the deenergizing operation of said fault-responsive means.

13. The invention as set forth in claim 12, in combination with additional time-delay means for prolonging the energization of said time-hesitation means for a predetermined time after the receiver relay ceases to be energized by the signalling current.

14. Protective equipment for a line-section of a transmission-line system, comprising line-sectionalizing circuit-interrupter means and relaying means at each end of the line-section being protected, and means for providing a communicating channel between the ends of the protected line-section, each of said relaying means including a trip-circuit means for the circuit-interrupter means, a normally inoperative transmitter means capable of transmitting an effective signalling current to said communicating channel, a normally inoperative receiver relay capable of receiving and responding to said signalling current, a time-hesitation relay, and means operating without any intentional time-delay in any of its functions, and responding to the existence of an external fault which is somewhere on the transmission system, but not in the protected line-section, for setting said transmitter-means in operation, and for so controlling said time-hesitation relay that a previously open contact thereof is closed after a time-delay sufficient to first insure sufficient time for the receiver-relay response, and for completing a partial circuit in said trip-circuit means, said trip-circuit means including a receiver-relay-responsive contact-means which is opened when said receiver relay is energized by said signalling current, said trip-circuit means including said previously open contact of said time-hesitation relay.

15. Protective equipment for a line-section of a transmission-line system, comprising line-sectionalizing circuit-interrupter means and relaying means at each end of the line-section being protected, and means for providing a communicating channel between the ends of the protected line-section, each of said relaying means including a trip-circuit means for the circuit-interrupter means, a normally inoperative transmitter means capable of transmitting an effective signalling current to said communicating channel, a normally inoperative receiver relay capable of receiving and responding to said signalling current, a uniform-time relay, a directional fault-responsive means for setting said transmitter-means in operation without intentional time-delay in response to the existence of an external fault which is somewhere on the transmission system but not in the protected line-section, a fault-responsive means for setting said uniform-time relay in operation without intentional time-delay in starting the operation of said uniform-time relay, and a fault-responsive means for completing a partial circuit in said trip-circuit means without intentional time-delay, said trip-circuit means including a receiver-relay-responsive contact-means which is opened when said receiver relay is energized by said signalling current, said trip-circuit means including a normally open time-relay contact which is closed, by the operation of said uniform-time relay, after a time-delay sufficient to first insure sufficient time for the receiver-relay response.

LESTER B. LE VESCONTE.
EDWARD H. KLEMMER.